No. 829,792. PATENTED AUG. 28, 1906.
W. A. KRAMER.
GRINDING MILL.
APPLICATION FILED DEC. 3, 1904.
7 SHEETS—SHEET 3.
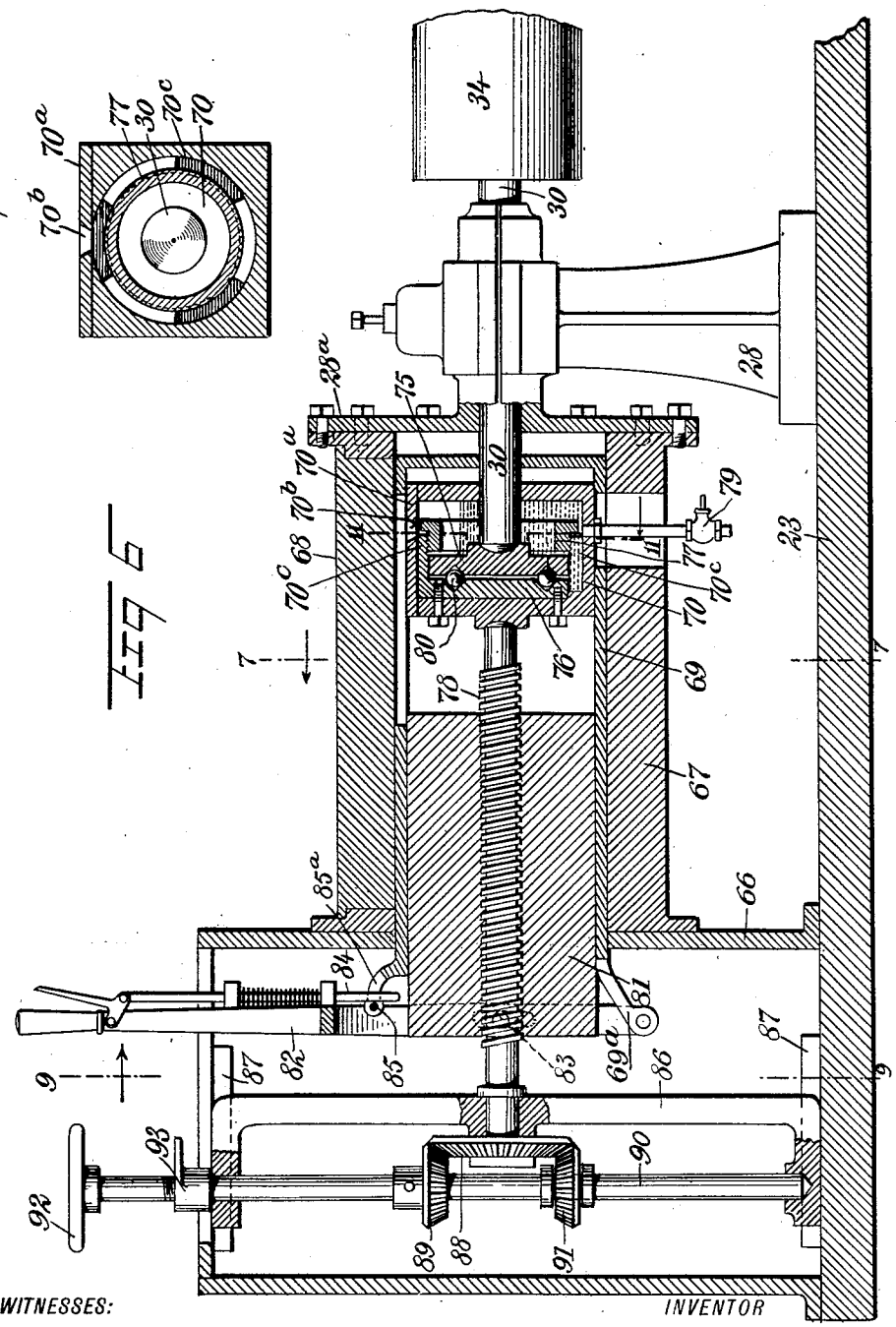
WITNESSES:
H. Walker
Isaac B. Owens.
INVENTOR
Walter A. Kramer
BY
ATTORNEYS No. 829,792. PATENTED AUG. 28, 1906.
W. A. KRAMER.
GRINDING MILL.
APPLICATION FILED DEC. 3, 1904.

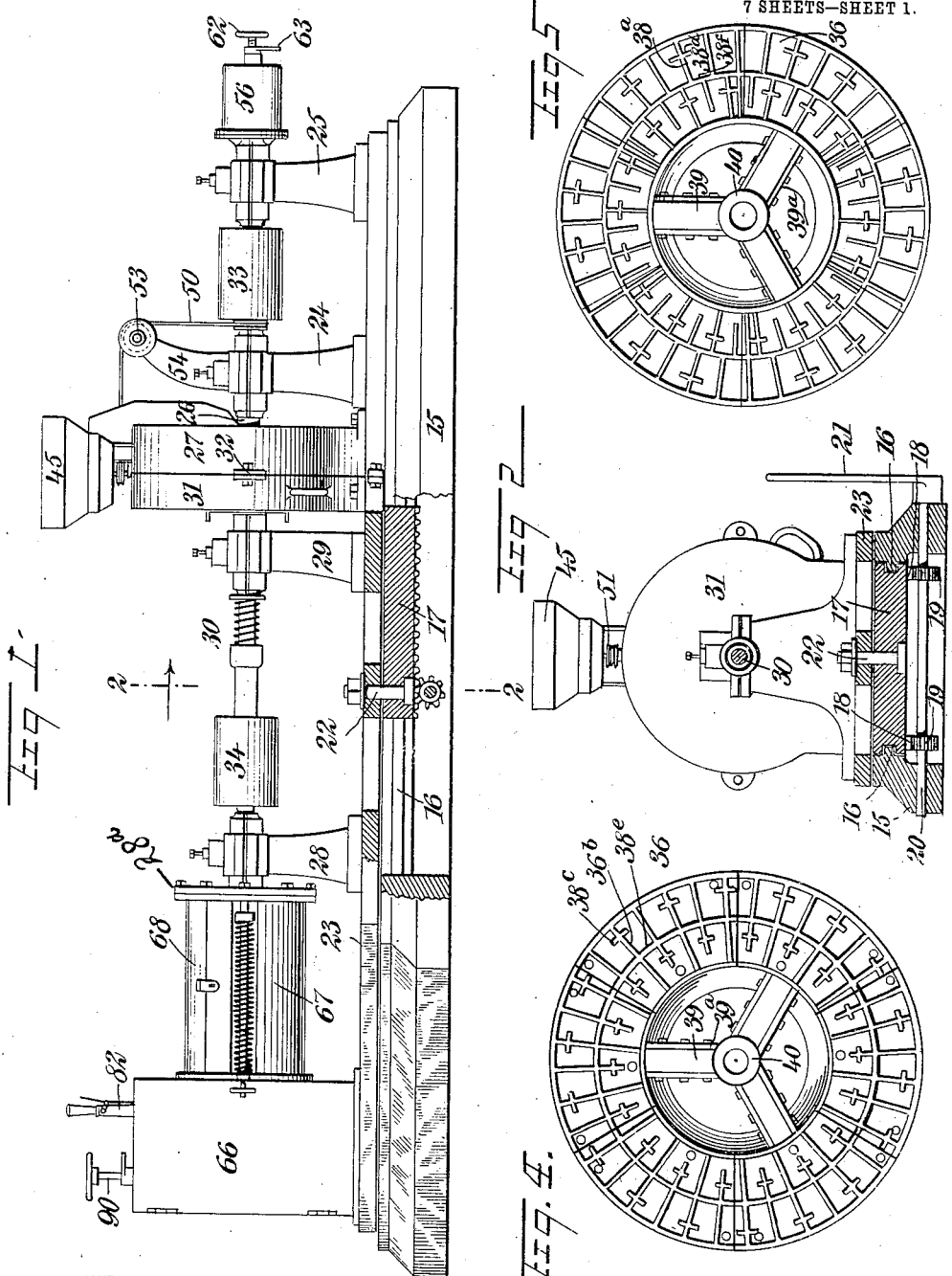

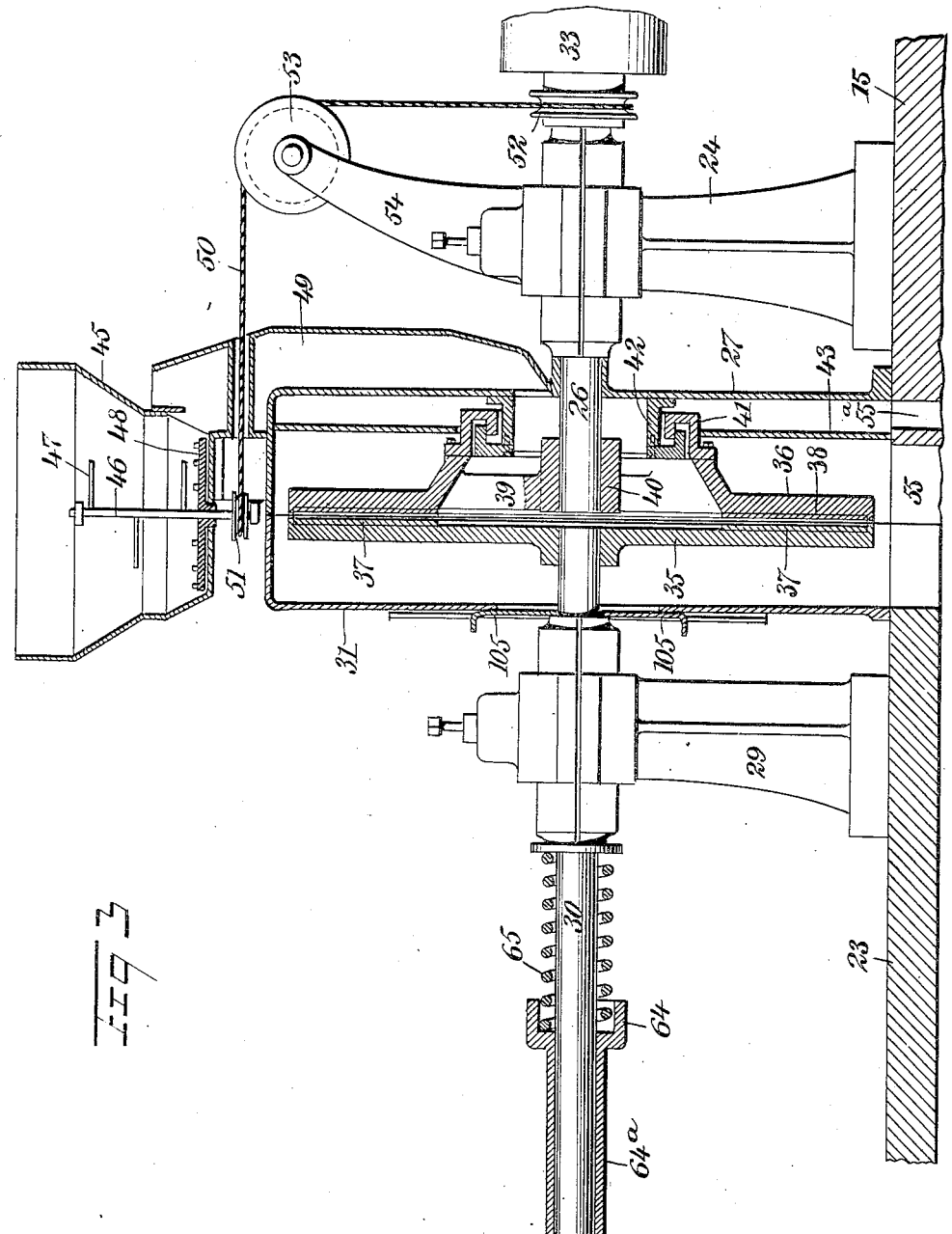

7 SHEETS—SHEET 4.

WITNESSES:
H. W. Walker
Isaac B. Owens

INVENTOR
Walter A. Kramer
BY
ATTORNEYS

No. 829,792. PATENTED AUG. 28, 1906.
W. A. KRAMER.
GRINDING MILL.
APPLICATION FILED DEC. 3, 1904.
7 SHEETS—SHEET 5.
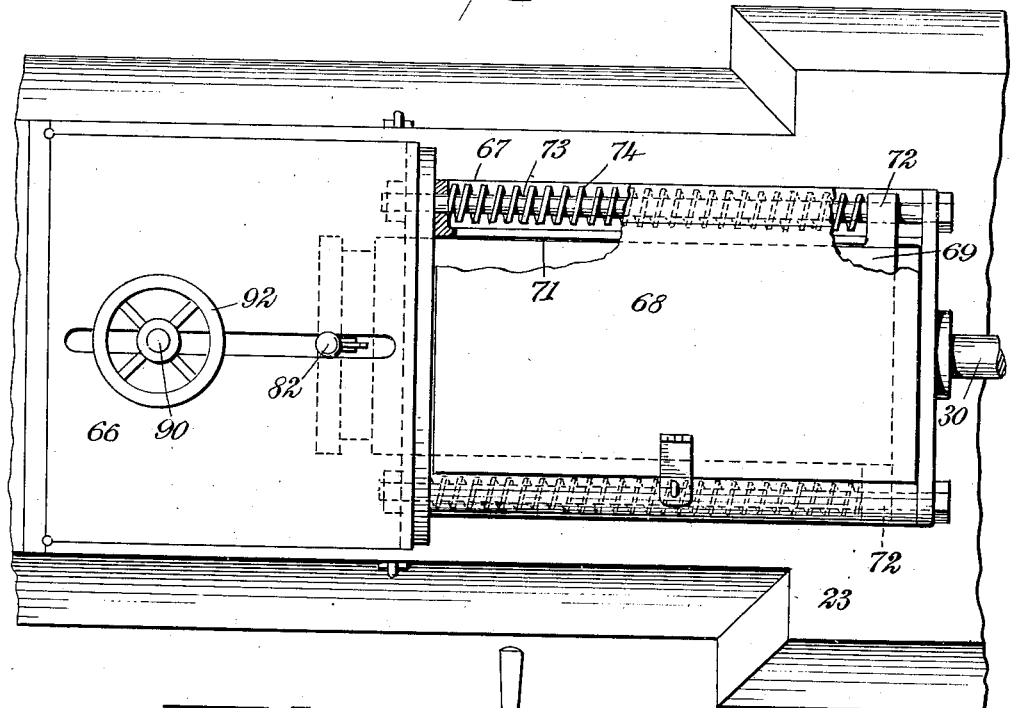
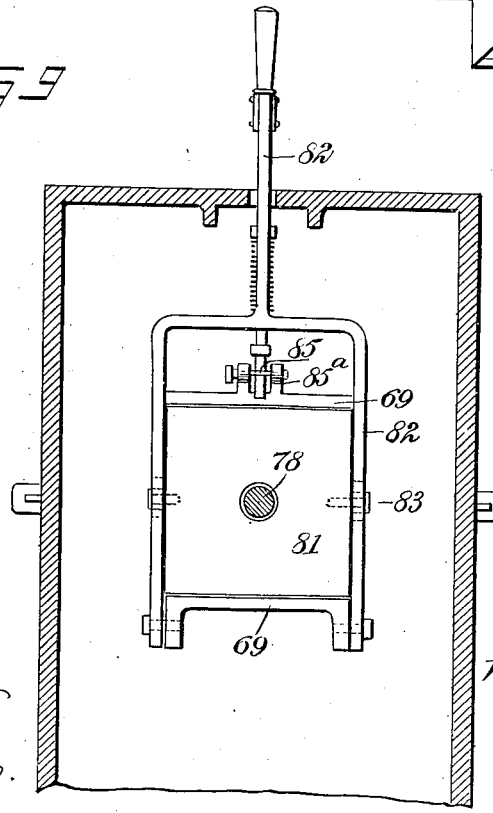
WITNESSES:
H. Walker
Isaac B. Owens.
INVENTOR
Walter A. Kramer
BY
ATTORNEYS No. 829,792. PATENTED AUG. 28, 1906.
W. A. KRAMER.
GRINDING MILL.
APPLICATION FILED DEC. 3, 1904.
7 SHEETS—SHEET 6.
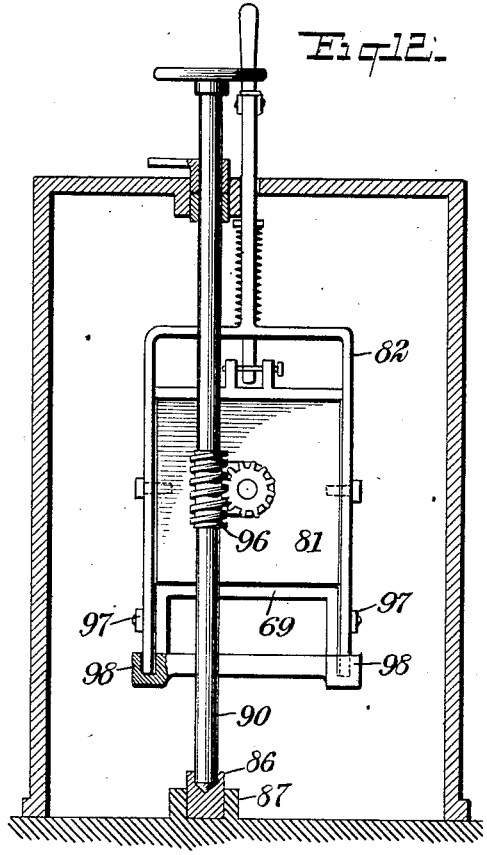
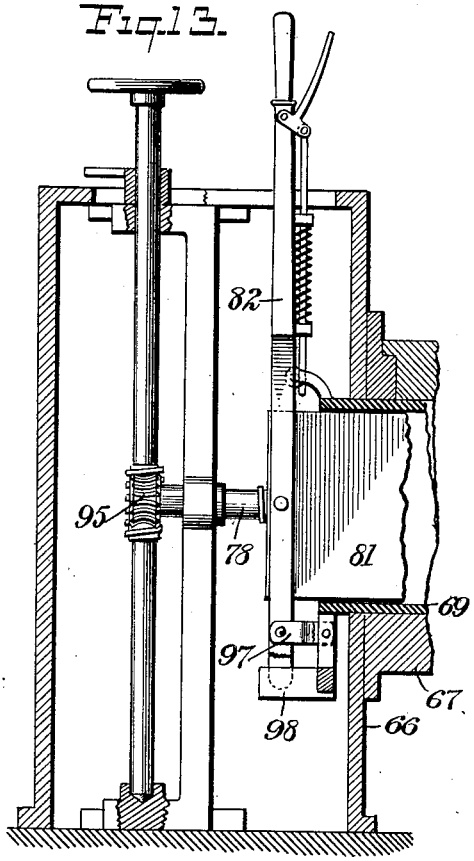
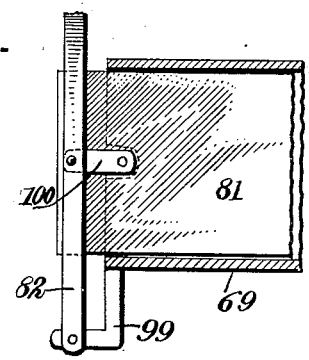
WITNESSES:
INVENTOR
Walter A. Kramer
BY
ATTORNEYS

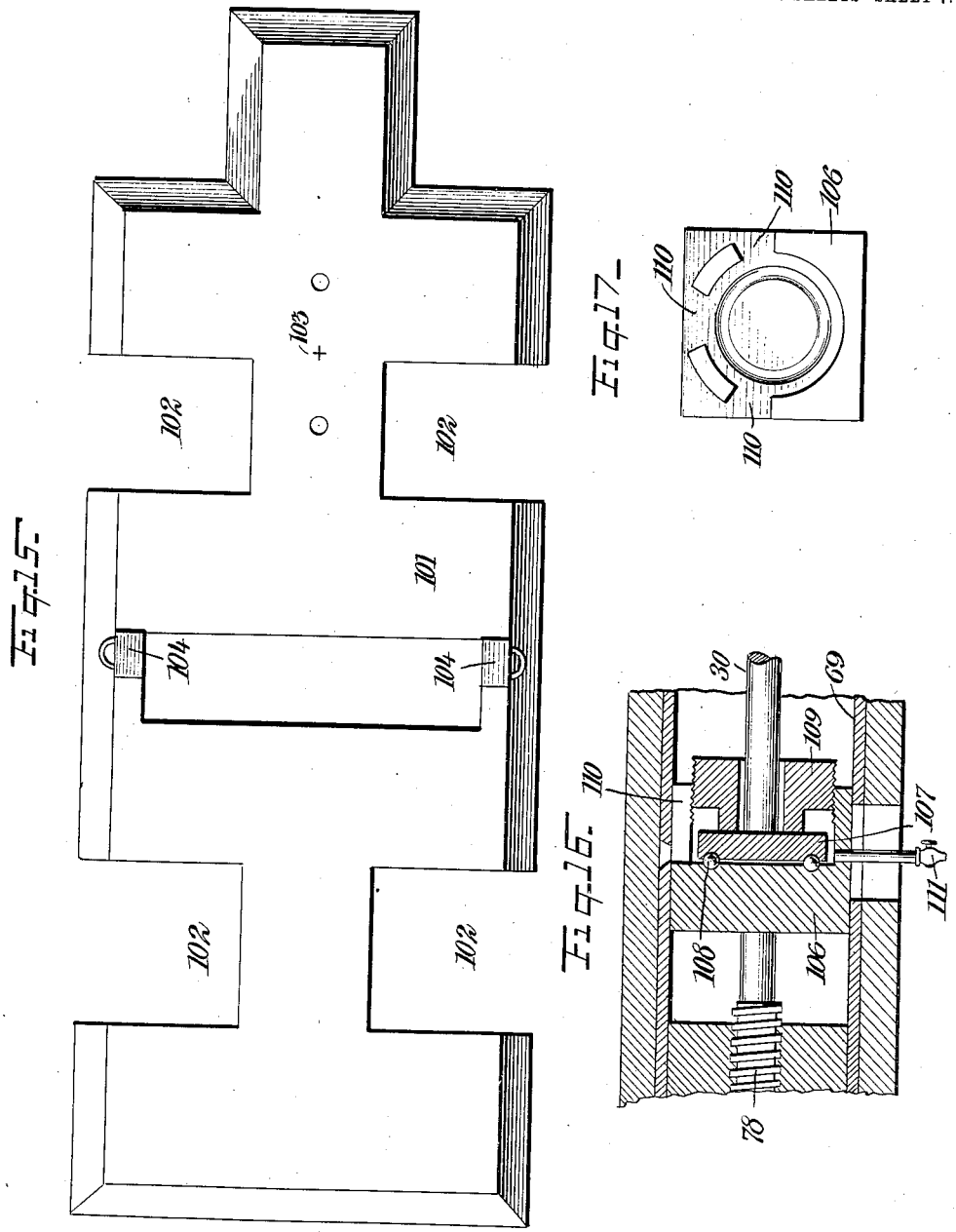

UNITED STATES PATENT OFFICE.

WALTER A. KRAMER, OF MUNCY, PENNSYLVANIA.

GRINDING-MILL.

No. 829,792.　　　　Specification of Letters Patent.　　　　Patented Aug. 28, 1906.

Application filed December 3, 1904. Serial No. 235,319.

*To all whom it may concern:*

Be it known that I, WALTER A. KRAMER, a citizen of the United States, and a resident of Muncy, in the county of Lycoming and State of Pennsylvania, have invented a new and Improved Grinding-Mill, of which the following is a full, clear, and exact description.

This invention relates to a mill for grinding various substances, particularly grain.

An important object of the invention is to provide means for mounting the grinding members so that they may be readily separated for repair and other purposes.

A further object is to provide for the effective lubrication of the running parts and to prevent breakage of the grinding-wheels in the event that a hard substance is passed between the wheels.

The invention involves various other features of major or minor importance, all of which will be fully set forth hereinafter and pointed out in the claims.

Reference is had to the accompanying drawings, which illustrate as an example the preferred embodiment of my invention, in which drawings like characters of reference indicate like parts in the several views, and in which—

Figure 7:
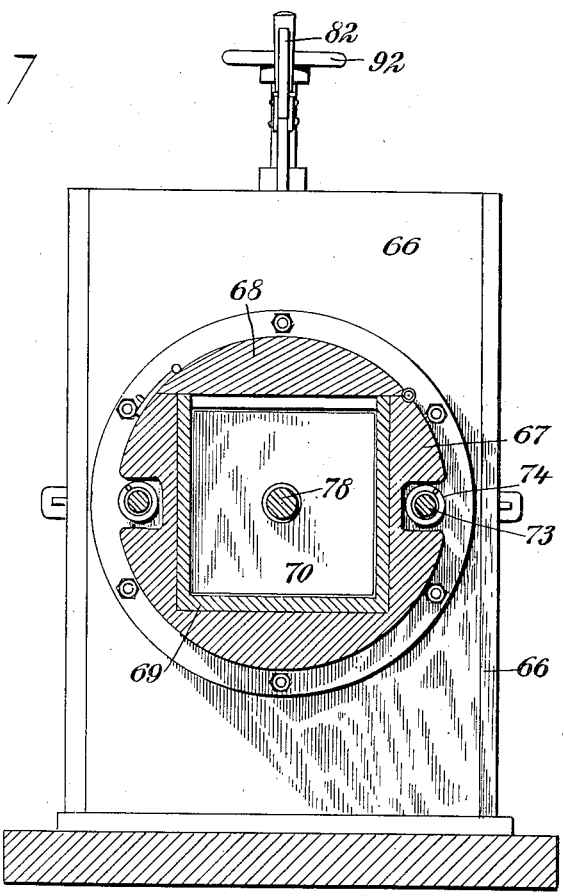
Figure 10:
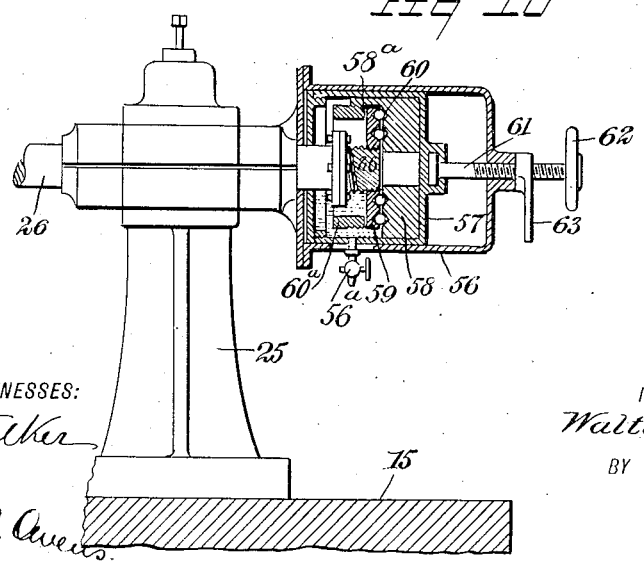

Figure 1 is a side elevation of the invention with parts broken away. Fig. 2 is a sectional elevation on the line 2 2 of Fig. 1 and looking in the direction of the arrow applied to said line. Fig. 3 is an enlarged longitudinal section of the grinding-wheels and their adjacent parts. Fig. 4 is a face view of one form of the grinding-wheels. Fig. 5 is a similar view of a different form of the grinding-wheels. Fig. 6 is an enlarged longitudinal section of the automatic relief mechanism for preventing fracture of the grinding-wheels. Fig. 7 is a section on the line 7 7 of Fig. 6 looking in the direction of the arrow applied to said lines. Fig. 8 is a plan view of the relief mechanism with parts broken away. Fig. 9 is a sectional view on the line 9 9 of Fig. 6 looking in the direction of the arrow applied to said line. Fig. 10 is a detail section showing the thrust-bearing shaft of one of the grinding-wheels. Fig. 11 is a cross-section on the line 11 11, showing the bearing in the relief mechanism. Fig. 12 is an end view showing a modification in the relief mechanism. Fig. 13 is a side view of the parts shown in Fig. 12. Fig. 14 is a detail side view showing a further modification. Fig. 15 is a plan view showing a modification in the base. Fig. 16 is a detail section showing a modification of the thrust-bearing illustrated in Fig. 6, and Fig. 17 is a detail view of a part shown in Fig. 16.

Referring to Figs. 1 to 11, inclusive, 15 indicates the main bed of the machine, which is centrally recessed and provided with tracks 16 at each side of the recess, these tracks mounting a carriage 17 to slide longitudinally of the frame within said recess. The carriage is provided with racks 18, engaged by pinions 19, carried on a shaft 20, revolubly mounted in the main frame 15 of the machine. To said shaft is attached an operating-handle 21, so that the pinions 19 may be operated to impart a sliding movement to the carriage 17. The carriage 17 pivotally mounts, by means of a bolt 22, the auxiliary bed 23 in such a way that the auxiliary bed slides with the carriage and is also capable of a turning movement thereon and on the main bed 15 around the center of the bolt 22. The main part 15 of the frame has two pedestal-bearings 24 and 25, mounting the shaft 26 of one of the grinding-wheels, and a casing-section 27, inclosing said grinding-wheel. The auxiliary frame or bed part 23 has pedestal-bearings 28 and 29, mounting the shaft 30, carrying the other grinding-wheel, and the auxiliary frame part 23 also has a casing-section 31, matching with the section 27, these two sections being removably connected together by fastenings 32. (See Fig. 1.) In this manner the parts may be engaged in operative arrangement, as shown in Figs. 1 and 3, or if it be desired to separate the grinding-wheels for any purpose the carriage 17 may be moved back, carrying with it the frame part 23 and its attachments, and when the casing-sections 31 and 27 have been sufficiently cleared the bed or frame part 23 may be given a turning movement around the pin 22, thus completely separating the two elements of the mill.

33 indicates the driving-pulley for the shaft 26, and 34 indicates the driving-pulley for the shaft 30. These shafts respectively carry the grinding-wheels, which are located within the casing-sections 27 and 31, 35 indicating the grinding-wheel of the shaft 30, and 36 indicating the grinding-wheel of the shaft 26. The grinding-wheel 35 is in the form of a disk provided with ribs 37 on its inner or working face, (see Fig. 3,) and the grinding-wheel 36 comprising an outer or main part with ribs 38, coacting with the ribs 37. (See Fig. 3.) This outer or main part is connected by spokes 39 with a hub 40, which may be of any suitable form and is mounted on the shaft 26. The spokes 39 have wear-plates 39$^a$ attached removably to their sides, so that when the plates become worn they may be removed and replaced. The form of the ribs on the grinding-disks is important. Examples are shown in Figs. 4 and 5; but I wish it understood that further modifications may be made without departing from the spirit of my invention. As shown in Fig. 4, the disk 36 has a number of concentric circular ribs 38$^e$, crossed by radial ribs 36$^b$, and these radial ribs are in turn crossed by short straight or arc-shaped ribs 38$^c$. The same parts are shown at 38$^a$, 38$^d$, and 38$^f$ in Fig. 5. This formation is effective in preventing the rapid outward movement of the material being ground and in holding this material inward toward the centers of the pockets on the disks, and by thus prolonging the movement of said material a thorough grinding action results. The formation of the ribs in the grinding-face of the disk, as shown in Figs. 4 and 5, is such that the radial and concentric ribs form inclosed spaces on the face of the disk, while the additional ribs 38$^c$ and 38$^d$, passing from certain of the radial ribs, form barriers resisting the outward movement of the material being ground.

The grinding-wheel 36 has an annular guard 41 attached thereto, (see Fig. 3,) this guard being flanged, as shown, and interengaging into a similar flange on a throat-ring 42, which is secured to the casing-section 27. The throat-ring 42 may be either integral or sectional, as desired, and forms the inlet for the material to be ground between the grinding-wheels, and the annular guard 41, coacting with the throat-ring, as shown in Fig. 3, prevents the escape of this material.

43 indicates a shield which is placed within the casing-section 27 and surrounds the guard 41. This shield serves to catch any unground material that may escape between the parts 41 and 42 and to discharge the same through the opening 55$^a$ in the base 15.

45 indicates a feed-hopper which is located over the grinding-wheels and carries revolubly a shaft 46, having agitator-arms 47 and also having an agitator-disk 48 fastened to the shaft and located on the bottom of the hopper. The arms 47 and disk 48 turn with the shaft 46 and serve to keep the material in the hopper in motion, the disk 48 being provided with lugs on its upper face which continually agitate the material in the hopper and cause it to be discharged laterally in a spout 49, which leads down and discharges into the throat-ring 42. The shaft 46 is kept continually in motion through the means of a belt 50, running over the pulley 51 on the shaft 46 and over a pulley 52 on the shaft 26.

53 indicates an idler-pulley carried in a bracket 54, rising from the pedestal 24, which supports the middle part of the belt 50 and changes its course in the manner shown in Fig. 3. The grain or other material being operated on is fed from the hopper 45 into the space between the active faces of the grinding-wheels and after being ground thereby is discharged from between the periphery of the wheels into any suitable receptacle, which may, for example, be placed under the opening 55, formed in the frame of the machine below the grinding-wheels.

Fig. 10 illustrates a thrust-bearing for the outer end of the shaft 26. This bearing comprises a case 56, suitably attached to the pedestal 25. Within this case is arranged a box 57, containing a bearing member 58. This bearing member coacts with a member 59, screwed on or otherwise fastened to the shaft 26, and between said bearing members antifriction-balls 60 are arranged. The members 58 and 59 are held engaged by a ring-nut 60$^a$, screwing in lugs 58$^a$, projecting from the member 58 around the edges of the member 59. The box 57 is designed to be filled or partly filled with oil, as indicated in Fig. 10, and is adjustable with the bearing members 58 and 59 by means of a screw 61, working in the case 56 and provided with a handwheel 62 and lock-nut 63, as shown. 56$^a$ indicates a cock for filling or draining the box 57.

Carried on the shaft 30 is an expansive spring 65, which engages the pedestal 29 and a collar 64 on a sleeve 64$^a$, attached to the pulley 34. This spring tends to move the shaft 30 and its grinding-wheel 35 leftward or away from the coacting grinding-wheel 36. Mechanism is provided, as shown in Figs. 6, 7, 8, and 9, for resisting this movement and for holding the grinding-wheel engaged, said mechanism, however, permitting the grinding-wheel 35 to yield when undue strain is placed thereon and also permitting the parts to be adjusted at will to regulate the distance between the grinding-wheels, and consequently to regulate the gage of the mill. This mechanism will now be described. Erected on the frame-section 23 is a housing 66, carrying rigidly a box 67, projecting rightward from the housing concentric to the shaft 30 and provided with a hinged lid 68 to permit access to the interior of the box. The pedestal 28 has a flange 28$^a$ bolted to the end of the box 67. The shaft 30 projects into the box 67 and into a sleeve 69, loosely fitted within the box 67. Said sleeve is preferably square in cross-section. The side walls of the housing 67 are formed with longitudinal slots 71, through which lugs 72 on the sleeve 69 project. These lugs are orificed loosely to receive rods 73, attached to the housing 66 and box 67, and encircling said rods are expansive springs 74, which bear against the housing and against the lugs and tend to hold the sleeve 69 firmly in the position shown in Figs. 6 and 8. Said sleeve 69 is immovable within the housing except under extraordinary pressure against it in a leftward or rearward direction. Fitted loosely in the sleeve 69 is a sliding block 81, in which operates a screw 78. The shaft 30 and screw 78 are joined by a peculiar thrust-bearing located in the right-hand end of the sleeve 69. This bearing comprises a box 70, with the rear wall of which the screw 78 is engaged and into which projects the shaft 30.

76 indicates a bearing member fastened in the box 70 and coacting with a bearing member 75, between which members antifriction-balls 80 operate. The members 76 and 75 are held engaged by a ring-nut 77, screwing in lugs 70ᶜ on the bearing member 76, these lugs being spaced from each other to allow the free passage of the lubricant, the same as the lugs 58ᵃ. (Shown in Fig. 10.) The box 70 is adapted to be filled or partly filled with oil and is fitted with a cover 70ᵃ, having an oil-opening 70ᵇ.

79 indicates a petcock for draining the box 70. This arrangement allows the shaft 30 to turn with the least possible friction and communicates the thrust of the shaft to the screw 78 and block 81.

Fulcrumed to a projection 69ᵃ from the lower rear end of the sleeve 69 is a forked lever 82, which has slots engaging pivots 83, attached to the block 81. This lever extends upward through the top of the housing 66 and is provided with a spring-actuated hand-dog 84. This dog is designed to engage a breakable pin 85, secured to the sleeve 69 by means of a fork 85ᵃ on the rear extremity of the sleeve 69. The rear extremity of the shaft 78 is revolubly mounted in a yoke 86, which slides in guides 87 within the housing 66, and said rear extremity of the shaft 78 carries a miter-gear 88, meshed with a corresponding gear 89, fast on a vertical shaft 90, and with a gear 91, loose on said shaft. The shaft 90 itself is mounted to turn in the yoke 86 and is provided with a hand-wheel 92 and lock-nut 93, respectively, to facilitate the operation of the shaft and to hold the same secure when desired.

In the operation of this part of my invention the hand-wheel 92 is turned to advance the threaded shaft 78 in the block 81, thus advancing the bearing-box 70, and consequently increasing the pressure on the shaft 30 to attain the desired or necessary adjustment of the grinding-wheel 35. During this operation of the screw 78 the block 81 retains its position, owing to the connection between said block and sleeve 69 through the medium of the lever 82. The yoke 86 and its attachments, however, follow the screw 78. When the desired adjustment has been attained, the lock-nut 93 should be thrown into action, thus holding the parts in the position in which they are put. The operation of the apparatus then goes on, and should a hard substance enter between the grinding-wheels or such other event take place as will cause an undue thrust to be exerted leftward on the shaft 30 the parts 70, 78, 81, 82, and 86 will tend to move leftward. In connection with this it will be observed that the lever 82, swinging around the center of its fulcrum at the lower extremity of the lever, will give the dog 84 a movement against the breakable pin 85, and consequently if the thrust on the shaft 30 reaches the predetermined danger-point the increased movement of the dog 84 will become so great as to break the pin 85, and then the rigid connection between the parts 69 and 81 will be destroyed, and the shaft 30, with its connections, will be free to move rearward or leftward to any degree necessary to prevent fracturing the grinding-wheels.

The springs 74 are intended to permit the grinding-disk having connection therewith to yield when under the influence of any foreign substance which may enter between the grinding-disks, while the breakable pin 85 is employed to give way in case of extreme outward movement of the shaft and disk attached thereto. These devices provide for the absolute safety of the various parts of the machine, and the operator may employ either or both, as the conditions under which the machine is operating may require.

In the organized operation of the apparatus as so far described the parts should be adjusted as shown in Fig. 1 and the thrust-bearings for the shafts 26 and 30 tightened up to the desired degree. The material to be ground will then be fed into the hopper 45 and the shafts 26 and 30 rotated diversely as the material is fed between the grinding-wheels, which material will be acted on by the grinding-surfaces and discharged from the periphery of the wheels out through the opening 55, as before explained. This operation will continue unless some foreign substance enters between the grinding-wheels or any other condition accrues which results in an undue thrust on the shaft 30, at which time the automatic relief devices in the housing 66 and box 67 will give way, thus relieving the grinding-wheels of the pressure thereon. The position of the grinding-wheels with respect to each other may be regulated from time to time during the operation of the machine through the medium of the hand-wheel 62 (see Fig. 10) and through the medium of the hand-wheel 92. (See Fig. 6.) To repair or adjust either of the grinding-wheels, the operation of the wheel should be arrested and the carriage 17 operated as before described.

Figs. 12 and 13 illustrate a modification in the arrangements within the housing 66. In this form of the invention the screw 78 is provided with a worm-wheel 95 in mesh with a worm 96 on the shaft 90, by which means the screw is rotated, as before explained. A further change is made in the arrangement of the forked lever 82, which instead of being pivoted from the projection from the sleeve 69 is pivoted in its lower end to links 97, and the sleeve has rearwardly-projecting guides 98, in which the lower extremities of the lever play.

Fig. 15 illustrates a modification in the base of the machine which allows the driving-belts for the pulleys 33 and 34 to pass downward below the frame. In this construction the base 101 has openings 102, allowing for the passage of the belt, as explained. It is also possible to vary the mechanism shown in Figs. 1 and 2, by means of which the auxiliary base portion 23 may be turned to expose the grinding-wheels and by such variations to dispense with the carriage 17, racks 18, gears 19, and shaft 20. In doing this the auxiliary portion 23 of the base is pivotally mounted on the main part of the base, the same as before described, the pivot being placed at approximately the point 103 on the drawings. When the auxiliary part of the frame is in active position, chocks 104 may be placed between the auxiliary base and suitable shoulders formed on the main base, these chocks preventing any turning movement of the auxiliary base portion. Upon removing the chocks, however, the base may be freely turned. In order to clear the grinding-wheels and their housing during this turning movement, the housing-section 31 is provided, as best shown in Fig. 3, with sliding closures 105, surrounding the shaft 30. These closures should be opened before turning the auxiliary base portion 23, thus permitting the devices shown in Fig. 6 to be actuated to move rearward the shaft 30, housing-section 31, and grinding-disk 35, clearing the housing-section 31 and grinding-disk 35 from the parts 27 and 36 and allowing the free turning movement of the parts, as explained.

Figs. 16 and 17 illustrate the modification of the thrust-bearing between the shaft 30 and screw 78. In this form of the bearing a cup-shaped bearing member 106 is engaged by the end of the screw 78 and placed loosely in the sleeve 69. In this bearing member is located a coacting bearing member 107, anti-friction-balls 108 operating between the two members. The coacting ball member is held in place by means of a ring-nut 109, which screws into the end of the bearing member 106. Said bearing member 106, as shown best in Fig. 17, has openings 110 formed in the upper portion thereof surrounding the ring-nut 109. This allows the introduction of oil into the bearing member to lubricate the moving parts. The shaft 30 extends through the nut 109 and engages the bearing member 107. 111 indicates a petcock for draining off the oil from the lower part of the bearing member 106.

Various changes in the form, proportions, and minor details of my invention may be resorted to at will without departing from the spirit and scope thereof. Hence I consider myself entitled to all such variations as may lie within the terms of my claims.

Having thus described the preferred form of my invention, what I claim as new, and desire to secure by Letters Patent, is—

1. A grinding-mill having a casing, a grinding element therein, a throat-ring, means establishing a sliding connection between said grinding element and throat-ring, and a partition lying in the casing at the side of the grinding element and around the throat-ring, said partition forming a chamber adapted to receive unground material escaping past the throat-ring.

2. A grinding-mill having a casing, a grinding element mounted therein, a throat-ring, means establishing sliding connection between the grinding element and throat-ring, and means for separating from the material ground such unground material as may escape past the throat-ring.

3. A grinding-mill comprising a frame or bed with bearings mounted thereon, a shaft revolubly carried in the bearing, means for driving the shaft, a grinding-disk attached to said shaft, a slide mounted on the bed or base, an auxiliary bed pivotally carried on the slide, means for moving the slide back and forth on the bed or base, a bearing carried on the auxiliary bed, a shaft revolubly mounted in said bearing, means for driving the shaft and a grinding-disk attached to the second shaft and coacting with the first-named disk.

4. A grinding-mill comprising a bed or base, a grinding-disk revolubly mounted thereon, means for driving the grinding-disk, a slide mounted on the bed or base, an auxiliary bed pivotally carried on the slide, means for moving the slide toward and from the first-named grinding-disk, a second grinding-disk revolubly mounted on the auxiliary bed, means for driving the second grinding-disk and a housing formed of sections carried respectively on the main bed and auxiliary bed, said housing inclosing the grinding-disks.

5. A grinding-mill comprising a bed or base, a grinding-disk revolubly mounted thereon, means for driving the grinding-disk, a slide mounted on the bed or base, means for moving the slide toward and from the grinding-disk, an auxiliary bed pivotally mounted on the slide, a second grinding revoluble disk carried on the auxiliary bed and coacting with the first-named disk and means for driving the second grinding-disk.

6. A grinding-mill provided with a horizontally - elongated bed, a grinding - disk mounted revolubly thereon, means for driving the grinding-disk, a slide mounted and horizontally movable on the bed, a means for reciprocating the slide, an auxiliary bed mounted by a vertical pivot on said slide, a grinding-disk revolubly mounted on the auxiliary bed and means for driving the last-named grinding-disk.

7. A grinding-mill provided with a horizontally - elongated bed, a grinding - disk mounted revolubly thereon, means for driving the grinding-disk, a slide mounted and horizontally movable on the bed, a means for reciprocating the slide, an auxiliary bed mounted by a vertical pivot on said slide, a grinding-disk revolubly mounted on the auxiliary bed, means for driving the second-named grinding-disk and a housing for the two grinding-disks, said housing being formed in sections respectively carried by the main and auxiliary bed.

8. A grinding-mill provided with a grinding-disk, having a central opening therein, an annular guard attached to the disk and surrounding the opening, said guard having an inwardly-directed flange, a throat-ring having an outwardly-directed flange interengaged with the flange of the guard, and means for mounting the throat-ring.

9. A grinding-mill provided with a grinding-disk, having a central opening therein, an annular guard attached to the disk and surrounding the opening, said guard having an inwardly-directed flange, a throat-ring having an outwardly-directed flange coacting with the flange of the guard, means for mounting the throat-ring, and a shield surrounding the annular guard and adapted to control the movement of the unground material escaping between the guard and the throat-ring.

10. A grinding-mill having a base provided with an opening for the discharge of the ground material, and with a second opening adjacent to the first, two grinding-disks coacting to discharge the ground material through the first-named opening, a throat-ring, means connecting the throat-ring with one of the disks, and a shield extending from said connecting means and adapted to direct to the second-named opening any ground material escaping between the throat-ring and grinding-disk.

11. A grinding-mill comprising a bed or base, a grinding element, a shaft attached thereto, a bearing carried on the bed in which bearing the shaft is revolubly mounted, a case attached to the bearing, a bearing member movably mounted in the case, means for moving said member, a second bearing member attached to the shaft and coacting with the first-named member, lugs projecting from the first-named bearing member, and a ring-nut engaged with said lugs and lying opposite a part of the second bearing member to hold the same in position.

12. A grinding-mill having a bed or base provided with a central recess having tracks along its side walls, a slide fitted on said tracks within the recess, means for moving the slide back and forth, an auxiliary bed pivotally mounted in the slide, rotatable grinding members respectively carried on the main and auxiliary beds and means for driving said grinding members.

13. A grinding-mill having a bed or base provided with a central recess having tracks along its side walls, a slide fitted on said tracks within the recess, means for moving the slide back and forth, an auxiliary bed pivotally mounted in the slide, rotatable grinding members respectively carried on the main and auxiliary beds, said slide moving horizontally, the pivot connecting the auxiliary bed with the slide extending vertically and means for driving said grinding members.

14. A grinding-mill comprising a bed or base, a grinding member mounted thereon, a horizontally-movable slide mounted on the bed or base, an auxiliary bed a vertical pivot mounting the auxiliary bed on the slide, a bearing carried by the auxiliary bed, a shaft revolubly mounted in the bearing, a grinding element carried by the shaft and coacting with the first-named grinding member, and spring-tension devices mounted on the auxiliary bed and coacting with the shaft thereof.

15. A grinding-mill comprising a bed or base, a shaft movably mounted thereon, a grinding element having connection with the shaft, a second shaft, a bearing between the two shafts, a movable member having connection with the second shaft, a sleeve loosely fitted on said movable member, means for mounting the movable member and sleeve, a breakable connection between said member and sleeve, and means for yieldingly resisting the movement of the sleeve.

16. A grinding-mill comprising a bed or base, a shaft revolubly mounted thereon, a grinding element carried by the shaft, a second shaft, a bearing between the two shafts, a movable member or block connected with the second-named shaft, a sleeve loosely inclosing the movable member or block, means for mounting the block or sleeve, a breakable means resisting the movement of the block independently of the sleeve, and a spring resisting the movement of the sleeve.

17. A grinding-mill comprising a bed or base, a shaft revolubly mounted thereon, a grinding element carried by the shaft, a second shaft, a bearing between the two shafts, a movable member or block connected with the second-named shaft, a sleeve loosely inclosing the movable member or block, means for mounting the block or sleeve, a breakable means resisting the movement of the block independently of the sleeve, and a spring resisting the movement of the sleeve, and said bearing between the two shafts being located within the sleeve.

18. A mill comprising a bed or base, a shaft revolubly mounted thereon, a grinding element carried by the shaft, a threaded shaft, a bearing between the two shafts, a movable member or block threaded to receive the threaded shaft, means in connection with the threaded shaft for adjusting the same on said movable member or block, a slidable sleeve inclosing the movable member, a breakable means acting between the movable member or block, and the sleeve to resist independent movement of the block, and a spring resisting movement of the sleeve.

19. A grinding-mill provided with a grinding-disk having an eccentric opening therein, an annular guard attached to the disk and surrounding the opening, said guard having an inwardly and thence laterally directed annular flange, a stationary throat-ring having an outwardly and thence laterally directed annular flange interengaged with the flange of the guard, and means for sustaining the throat-ring.

20. A grinding-mill having a bed or base provided with a central recess, a slide fitted to move in the recess, means for moving the slide back and forth, an auxiliary bed pivotally mounted on the slide, a rotatable shaft carried on the auxiliary bed, means for sustaining said shaft, a grinding member attached to the shaft, and a second grinding member mounted on the main bed or base and coacting with the first-named grinding member.

21. A grinding-mill having a bed or base provided with a central recess, a slide fitted to move in the recess, means for moving the slide back and forth, an auxiliary bed pivotally mounted on the slide, a rotatable shaft carried on the auxiliary bed, means for sustaining said shaft, a grinding member attached to the shaft, a second grinding member mounted on the main bed or base and coacting with the first-named grinding member, and a means also carried on the auxiliary bed for exerting a yielding pressure on said shaft to hold the grinding members engaged with each other.

In testimony whereof I have signed my name to this specification in the presence of two subscribing witnesses.

WALTER A. KRAMER.

Witnesses:
  EDW. S. McGRAW,
  J. M. REILLY.